(12) United States Patent  (10) Patent No.: US 9,380,422 B1
Sakihama et al.  (45) Date of Patent: Jun. 28, 2016

(54) METHOD FOR CAPTURING AND SERVING CONTENT BASED ON USER LOCATION

(71) Applicant: The DIRECTV Group, Inc., El Segundo, CA (US)

(72) Inventors: Dean Sakihama, El Segundo, CA (US); Matthew T. Rasmussen, Los Angeles, CA (US); Harry Porudominsky, Westchester, CA (US); Jackson Jarrell Pair, Marina Del Rey, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/598,046

(22) Filed: Jan. 15, 2015

(51) Int. Cl.
  *H04W 4/02*  (2009.01)
(52) U.S. Cl.
  CPC ..................................... *H04W 4/021* (2013.01)
(58) Field of Classification Search
  None
  See application file for complete search history.

(56) References Cited

U.S. PATENT DOCUMENTS

| | | | | |
|---|---|---|---|---|
| 8,204,684 B2 * | 6/2012 | Forstall | ................... | G01C 21/20 455/456.1 |
| 8,204,692 B2 * | 6/2012 | Arango | ................... | E21B 41/00 340/853.2 |
| 8,301,159 B2 * | 10/2012 | Hamynen | ........... | G06F 17/3087 455/456.1 |
| 8,301,765 B2 * | 10/2012 | Goodman | .............. | G06Q 10/06 370/338 |
| 8,521,180 B2 * | 8/2013 | Parish | ................. | H04L 63/0807 455/414.3 |
| 8,977,296 B1 * | 3/2015 | Briggs | .................. | H04W 24/00 455/456.1 |
| 2002/0102974 A1 * | 8/2002 | Raith | .................... | H04W 88/06 455/434 |
| 2002/0111180 A1 * | 8/2002 | Hogan | .................. | H04W 48/16 455/518 |
| 2009/0003314 A1 * | 1/2009 | Hubner | ................... | H04M 3/42 370/352 |
| 2010/0114493 A1 * | 5/2010 | Vestal | ..................... | E21B 44/00 702/9 |
| 2011/0287786 A1 * | 11/2011 | Cassapakis | ......... | G06F 17/3087 455/456.3 |
| 2014/0157333 A1 * | 6/2014 | Daniel | ............... | H04N 21/2143 725/81 |

* cited by examiner

*Primary Examiner* — Ashish K Thomas
(74) *Attorney, Agent, or Firm* — Harness, Dickey & Pierce, P.L.C.

(57) ABSTRACT

A mobile device includes a location module that determines a location of the mobile device. A controller receives the location of the mobile device as determined by the location module, compares the location of the mobile device to a plurality of stored locations, and provides a notification to a user of the mobile device in response to a determination that the location of the mobile device is within a predetermined range of a first stored location of the plurality of stored locations. The plurality of stored locations correspond to contact devices associated with respective content, and the notification includes information about the respective content associated with a first contact device of the contact devices in the first stored location.

14 Claims, 5 Drawing Sheets

METHOD FOR CAPTURING AND SERVING CONTENT BASED ON USER LOCATION

TECHNICAL FIELD

The present disclosure relates generally to providing content to a mobile device, and, more specifically, providing content to the mobile device based on location of the mobile device.

BACKGROUND

The statements in this section merely provide background information related to the present disclosure and may not constitute prior art.

Consumers increasingly carry and rely upon one or more mobile electronic devices and/or access electronic devices integrated with a vehicle. The mobile devices may include, but are not limited to, cellular phones and smartphones, tablet computers, laptop computers, media players, and/or wearable electronic devices. Vehicles may include integrated electronic devices including, but not limited to, navigation systems, audio systems, and/or media players.

Mobile devices and vehicle-integrated electronic devices may implement one or more forms of communication including, but not limited to, cellular communication, wireless data communication (e.g., Wi-Fi, WiMAX, or other wide or local area network), and/or Bluetooth or other short range communication.

SUMMARY

The present disclosure relates generally to providing content to a mobile device based on a location of the mobile device. A user may selectively access the content using the mobile device.

In one aspect of the disclosure, a mobile device includes a location module that determines a location of the mobile device. A controller receives the location of the mobile device as determined by the location module, compares the location of the mobile device to a plurality of stored locations, and provides a notification to a user of the mobile device in response to a determination that the location of the mobile device is within a predetermined range of a first stored location of the plurality of stored locations. The plurality of stored locations correspond to contact devices associated with respective content, and the notification includes information about the respective content associated with a first contact device of the contact devices in the first stored location.

In a further aspect of the disclosure, a method of operating a mobile device includes determining a location of the mobile device, comparing the location of the mobile device to a plurality of stored locations, and providing a notification to a user of the mobile device in response to a determination that the location of the mobile device is within a predetermined range of a first stored location of the plurality of stored locations. The plurality of stored locations correspond to contact devices associated with respective content, and the notification includes information about the respective content associated with a first contact device of the contact devices in the first stored location.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A server side device, such as a content or service provider, is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, the following disclosure is made with respect to the delivery of video (e.g., television (TV), movies, music videos, etc.), as well as delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The following disclosure may be applicable to example DIRECTV® broadcast services and systems and/or other delivery systems. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among various devices can be reallocated as desired without departing from the intended scope of the present patent.

A mobile electronic device (e.g., a mobile device carried/worn by a user and/or integrated with a vehicle) may implement one or more mechanisms for transmitting data to and/or receiving data from another device. For example only, the mobile device may implement location or navigational technology such as a global position system (GPS), wireless communication (e.g., cellular and/or wireless data communication), and/or various short range communication mechanisms (e.g., Bluetooth, RFID, sensors, etc.).

In content access systems and methods according to the principles of the present disclosure, a mobile device may receive and/or "bookmark" (i.e., save or mark for later review) content based on a location of the mobile device and/or proximity of the mobile device to another device associated with the content.

For example, when a mobile device (e.g., carried by a user, integrated with a vehicle, etc.) passes within a predetermined range of another device associated with a particular service and/or content (hereinafter referred to as a "contact device"), the mobile device receives one or more identifiers, or provides a notification to a user regarding one or more identifiers already stored on the mobile device. The contact device may transmit the identifiers, the mobile device may receive the identifiers via another source (e.g., via a wireless data or cellular network), and/or the mobile device may already store the identifiers on the mobile device. The identifiers correspond to a product or service associated with the contact device. For example, the contact device may correspond to an advertisement for the product or service (e.g., a kiosk, billboard, sign, etc.), and the identifiers identify the advertised product or service. The identifiers may also include other information including, but not limited to, the time of day the mobile device passed the contact device and/or the location of the contact device. Accordingly, the identifiers may indicate that a user passed within the predetermined range of (i.e., came into contact with, viewed, etc.) the contact device at a certain time and place.

The user may be provided with a notification that the identifiers were transmitted to the mobile device (or, in implementations where the identifiers are already stored on the mobile device, a notification that the user encountered a corresponding contact device), and may "accept" the identifiers (e.g., "bookmark" the content associated with the identifiers to receive additional information about the corresponding product, service, or content using the mobile device or another device) or "reject" the identifiers (e.g., clear the notification from a display of the mobile device). For example, the user may download the associated content immediately or at a later time using the mobile device or another device. The contact device or another device (e.g., a content provider or other server side device via a network) may provide the content for download.

Figure 1:
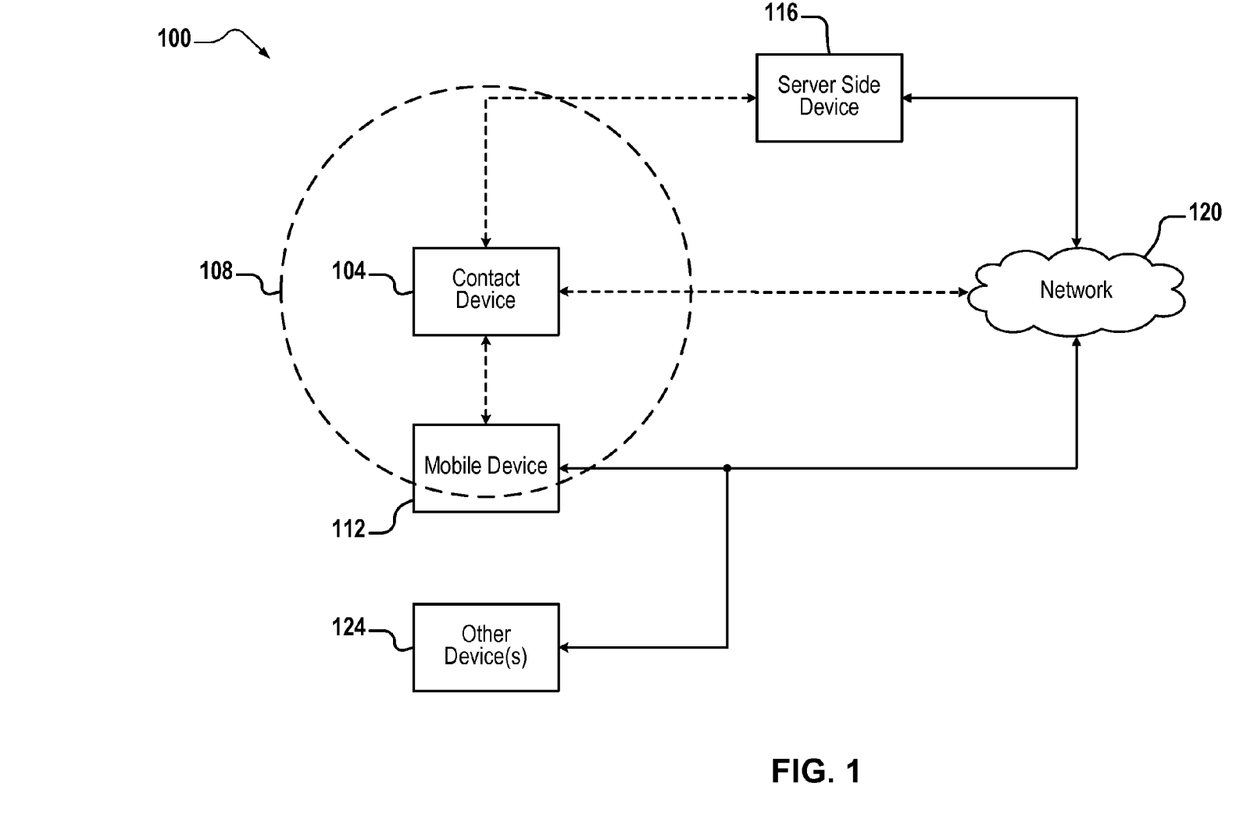
FIG. 1 is a block diagrammatic view of a communication system according to one example of the present disclosure.

Referring now to FIG. 1, an example contact access system 100 according to the principles of the present disclosure includes a contact device 104. The contact device 104 may be located in and/or correspond to a kiosk, billboard, sign, or any other suitable structure. For example, the contact device 104 may correspond to a base station, access point, or other device configured to communicate with mobile devices according to short, mid, and/or long range wireless communication protocols. In other implementations, the contact device 104 may be passive and not include a device capable of communicating directly with mobile devices.

The contact device 104 (or, a nearby location, such as a restaurant, store, etc.) may be associated with a particular product, service, or content (e.g., multimedia content). For example, the contact device 104 may include an advertisement. Mobile devices passing within a predetermined range (indicated by 108) may be provided with one or more identifiers corresponding to the advertised product, service, or content. The identifiers include information about the product, service, or content associated with/advertised by the contact device 104, and may include additional information such as a location of the contact device 104 and a time and date that the identifiers were provided to a particular mobile device.

In a first example implementation, the predetermined range 108 may correspond to a communication range of the contact device 104, and the contact device 104 is configured to transmit the identifiers to a mobile device 112 passing within the range 108. For example only, the contact device 104 may automatically transmit the identifiers upon detecting the presence of the mobile device 112 within the range 108, and/or the contact device may periodically transmit a beacon or other signal including the identifiers. Alternatively, the mobile device 112 may initiate communication with the contact device 104. In another implementation, the mobile device 112 may already store the identifiers, and provides a notification to the user regarding the identifiers in response to communication with the contact device.

Regardless of how communication with the mobile device 112 is established (and regardless of whether the identifiers were previously stored on the mobile device), the user of the mobile device 112 is provided a notification (e.g., via a display of the mobile device 112) regarding the identifiers. For example, the notification may identify the content associated with the identifiers and prompt the user to perform some action. For example, the user can request further content associated with the identifiers, or ignore or clear the notification. If the user requests further content, the contact device 104 may provide the content directly to the mobile device 112, and/or the content may be provided to the user from a server side device 116 (e.g., a content and/or service provider, an advertising server, etc.) via the contact device 104 or a communication network 120 (e.g., the Internet, a cellular network, a wireless data network, etc.). The user may also bookmark the identifiers (e.g., save some indication to the mobile device 112 to remind the user to access related content) for later retrieval using the mobile device 112 or one or more other devices 124 (e.g., a home computer or laptop). Although referred to herein as the server side device 116, the server side device 116 can be understood as corresponding to a content provider, a service provider, a head end of a television (or other media) signal broadcast provider, and/or any other suitable device, server, or network node, and the system 100 may communicate with separate content providers, service providers, and or head ends.

Examples of content provided in response to the user request include, but are not limited to, adding a product to a wish list or shopping list associated with the user, downloading a movie trailer to the mobile device 112, a home media device, and/or cloud storage associated with the user, playing a song or commercial on the mobile device 112 or vehicle radio, changing a radio station, etc.

In another example implementation, the contact device 104 may be "passive" (e.g., not configured to communicate directly with the mobile device 112). Instead, the predetermined range 108 corresponds to a "geo-fence" or other location-based boundary. For example, the mobile device 112 may include a GPS or other navigational device and receives a notification (e.g., the identifiers) via the network 120 when the mobile device 112 passes within the geo-fenced area defined by range 108. In one implementation, the mobile device 112 may implement a mobile app or other application that generates the identifiers (or retrieves the identifiers previously stored on the mobile device 112) when the mobile device 112 passes within the range 108. For example, the application may store information associating various specific locations with respective contact devices 104. Accordingly, when the mobile device 112 passes within the range 108 of the contact device 104 (e.g., carried by a user or in a vehicle), the mobile device 112 generates/retrieves the respective identifiers based on the stored information. Alternatively, the mobile device 112 may retrieve the identifiers from the network 120 in response to a determination that the mobile device 112 passed within the range 108. The user may then request further content associated with the identifiers or ignore/delete the identifiers (or simply clear the notification) as described above.

Further, the mobile device 112 and/or an entity such as the server side device 116 may implement systems and methods for determining which content to provide and/or advertise to the user of the mobile device 112 based on the response of the user to the identifiers. For example, the mobile device 112 may track the identifiers transmitted to the mobile device 112 (or notifications associated with identifiers already stored on the mobile device), and/or actions taken by the user in response to the identifiers (e.g., whether the user accepted or rejected a notification associated with a particular identifier, whether the user viewed the content associated with the identifier, etc.). The mobile device 112 may store data that indicates that the user encountered the contact device 104 regardless of whether the user accepted or rejected the notification. For example, the mobile device 112 may store all identifiers received by the mobile device 112, and/or, for each identifier already stored on the mobile device 112, simply store some indicator that the user encountered the contact device 104. For example, each identifier stored on the mobile device 112 may include an indicator of a number of times the user encountered a contact device associated with the respective identifier.

The mobile device 112 (and/or the other device 124, the network 120, the server side device 116, etc.) may perform one or more other functions based on which identifiers were received by the mobile device 112. For example, the content associated with the identifier may be relevant to a (web-based) search or other browsing function. If the content is relevant to the function, the mobile device 112 may provide results based on whether the user encountered the contact device 104 (i.e., based on whether the mobile device 112 received the notification of the identifier associated with the contact device 104).

For example, if the function performed by the mobile device 112 corresponds to a search (e.g., via the network 120, the server side device 116, etc.), the results of the search may be provided based on whether the mobile device 112 is storing an identifier, associated with particular content, indicating that the user of the mobile device encountered the contact device 104. If the mobile device 112 is storing the identifier (or other indicator), the corresponding content may be assigned a greater weight, search relevance score, or other value. Accordingly, the search result corresponding to the content may be presented in a higher position in a search result list. Other functions affected by the weight given to the content may include, but are not limited to, advertisements played while the user plays other media, advertisements provided during web browsing, etc.

The data indicating that the user encountered the contact device 104 (e.g., the identifiers and/or some other data indicating that the mobile device 112 received the notification about the identifiers) may be stored on the mobile device 112 and/or provided by the mobile device to the other device 124, the server side device 116, or one or more other entities. The mobile device 112 or other entity may associate one or more of the identifiers with the corresponding user. Accordingly, the user may be provided other content based on the identifiers. For example, if the identifiers associated with the user are shared with the server side device 116, the user may be presented with commercials or other advertisements based on the identifiers, suggested content based on the identifiers, suggested products based on the identifiers, coupons or other offers based on the identifiers, etc.

In some embodiments, the identifiers may be provided from the mobile device 112 to the other entities without an association to the particular user (i.e., the user may be unknown/anonymous). Accordingly, the other entities (e.g., a particular advertiser associated with the contact device 104 and/or related content) may merely receive information regarding, for example only, a number of consumers encountering the contact device 104, a percentage of consumers that accepted or rejected the notifications pertaining to particular content, times of day that consumers encountered the contact device 104, etc. In other words, the information may be indicative of consumer traffic proximate to and/or consumer reaction to the contact device 104. In this manner, the collected information (e.g., the identifiers or other data) can be associated with a particular contact device 104 (e.g., a particular advertisement or location) instead of a particular user.

Figure 2:
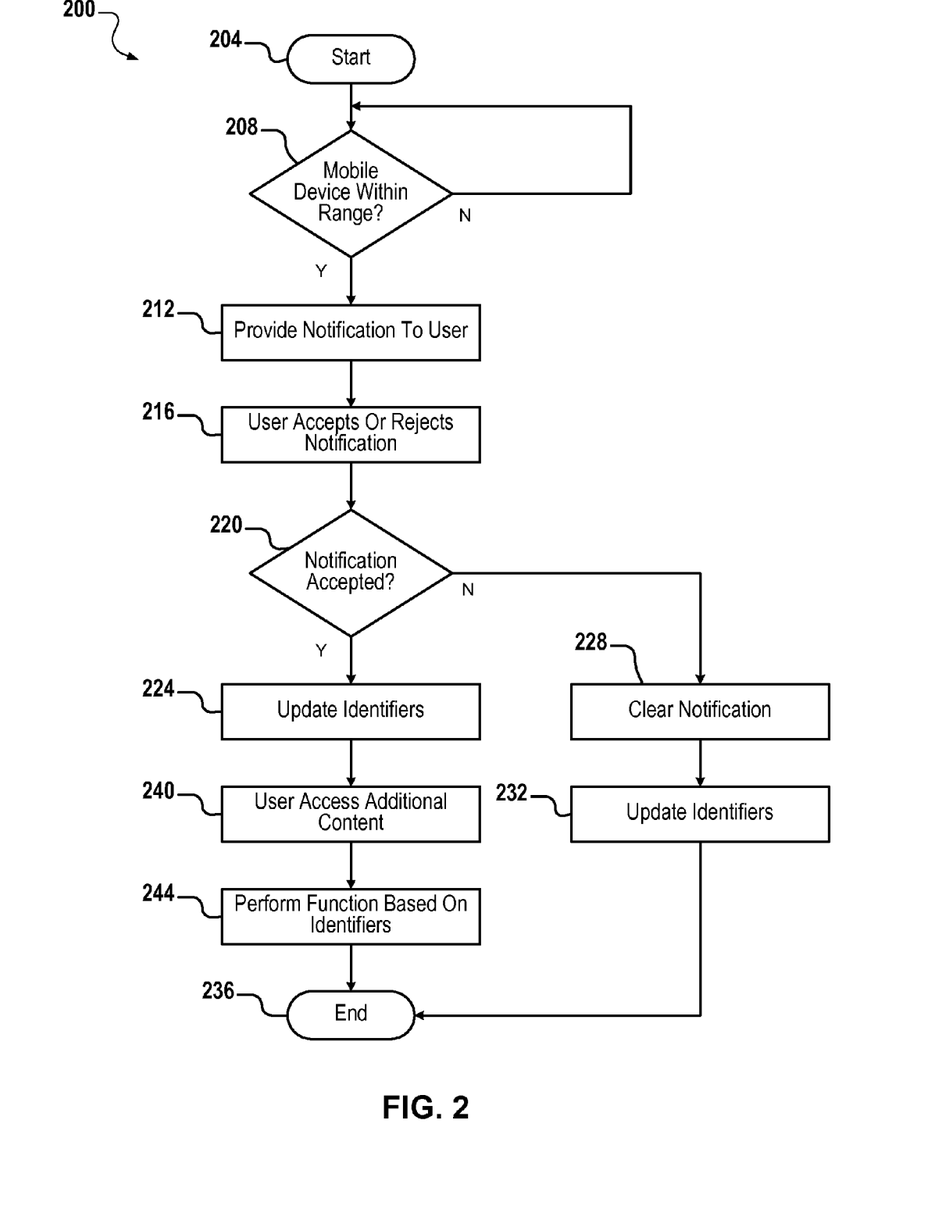
FIG. 2 is a block diagrammatic view of a first example method according to the present disclosure.

Referring now to FIG. 2, an example method 200 according to the principles of the present disclosure begins at 204. At 208, the method 200 determines whether a mobile device is within a predetermined range of a contact device. For example, the method 200 may determine whether the mobile device is within the predetermined range based on a location of the mobile device with respect to a geo-fenced area containing the contact device, or based on communication between the mobile device and the contact device. If true, the method 200 continues to 212. If false, the method 200 continues to 208.

At 212, the method 200 provides a notification to the user based on the identifiers of the content associated with the contact device. For example, the contact device, a service provider, a content provider, or another device may transmit the identifiers to the mobile device, or the mobile device may simply generate a notification based on the identifiers. At 216, the user optionally accepts (e.g., bookmarks or sets a reminder regarding the content) or rejects (e.g., clears) the notification. At 220, the method 200 determines whether the user accepted the notification. If true, the method 200 continues to 224. If false, the method 200 continues to 228. At 228, the method 200 clears the notification from the display of the mobile device and continues to 232. At 232, the method 200 optionally updates the identifiers stored on the mobile device and ends at 236. For example, the method 200 may store other information indicating that the user of the mobile device was provided with a notification about the content pertaining to a particular identifier, and may transmit the other information from the mobile device to other entities (e.g., a server side device such as a content or service provider, an advertiser, etc.).

At 224, the mobile device and/or another entity updates the information about the identifiers. At 240, the user accesses additional content related to the identifiers. At 244, the user performs a function of the mobile device or another device. For example, the user performs a browser-based search. At 244, the mobile device performs a function of the mobile device based in part on the updated identifiers. For example, the mobile device provides search results based on the one or more identifiers stored in the mobile device. The method ends at 236.

Figure 3:
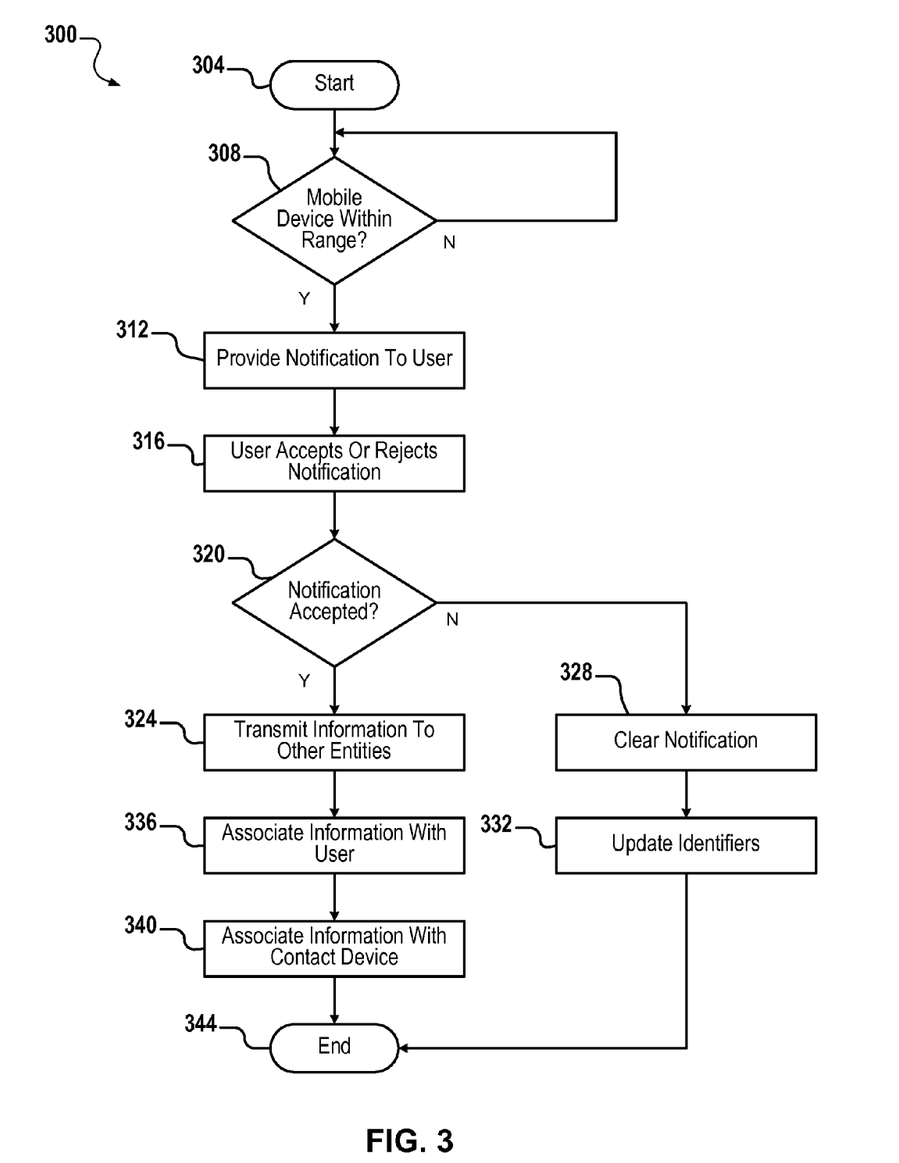
FIG. 3 is a block diagrammatic view of a second example method according to the present disclosure.

Referring now to FIG. 3, another example method 300 according to the principles of the present disclosure begins at 304. At 308, the method 200 determines whether a mobile device is within a predetermined range of a contact device. If true, the method 300 continues to 312. If false, the method 300 continues to 308.

At 312, the method 300 provides a notification based on one or more identifiers of content associated with the contact device to the mobile device. At 316, the user accepts or rejects the notification. At 320, the method 300 determines whether the user accepted the identifiers. If true, the method 300 continues to 324. If false, the method 300 continues to 328. At 328, the method 200 clears the notification from the mobile device and continues to 332. At 332, the method 300 optionally updates information about the identifiers.

At 324, the mobile device and/or the contact device transmits information to other entities (e.g., a server side device such as a content or service provider, an advertiser, etc.) that indicates that the user was provided with a notification based on the identifiers associated with the content. The information may include, but is not limited to, an indication of whether the user accepted or rejected the notification, which contact device the user encountered to prompt the notification, and/or the time of day the mobile device received the notification.

At 336, the method 300 optionally stores data associating the received information with the user of the mobile device. For example, the data may include information about which contact devices prompted the notification, whether the user accepted or rejected the notification, and/or whether the user subsequently accessed content related to the identifiers associated with the notification. At 340, the method 300 optionally stores data associating the received information with the contact device that prompted the notification being provided on the mobile device. For example, the data may include information about a quantity of mobile devices that encountered the contact device, times of day that various mobile devices encountered the contact device, and/or percentages of users that accepted or rejected the notification. The method ends at 344.

Figure 4:
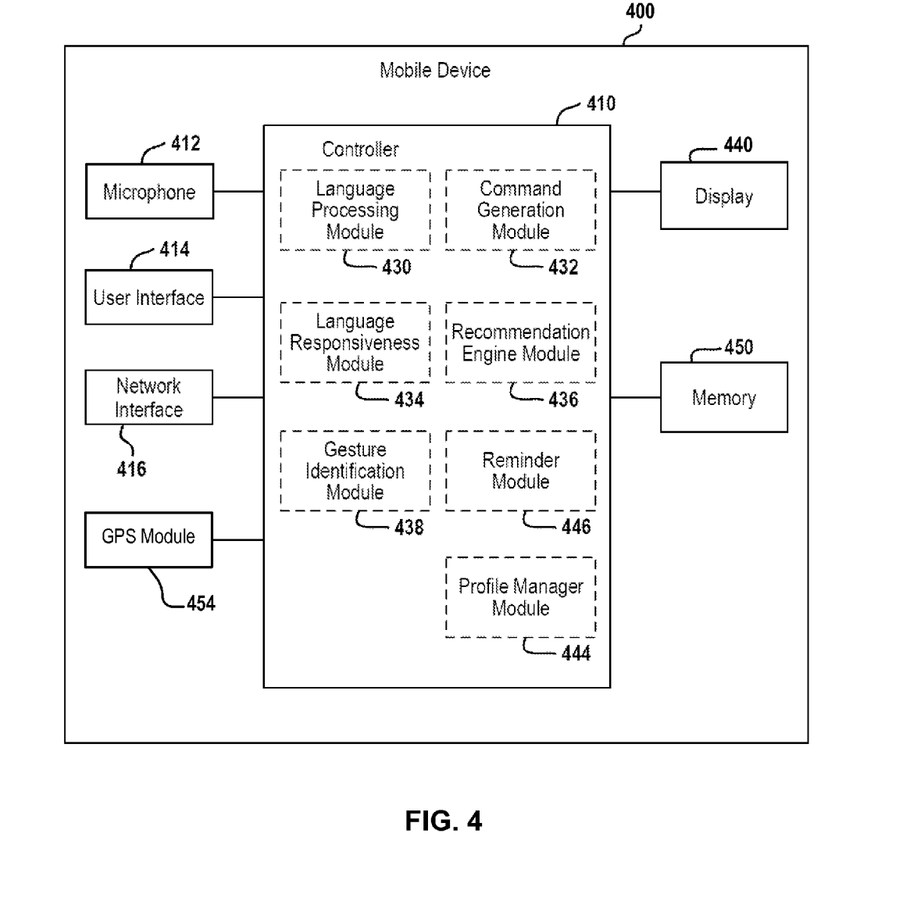
FIG. 4 is a block diagrammatic view of a mobile device according to one example of the present disclosure.

Referring FIG. 4, an example mobile device 400 is shown. The mobile device 400 includes a controller 410 that controls various functions of the mobile device 400. The controller 410 is in communication with a microphone 412 that receives audible signals and converts the audible signals into electrical signals. The audible signals may include a request signal. The request signal may be to perform a search or initiate various functions of the mobile device 400. The controller 410 is also in communication with a user interface 414. The user interface 414 may be buttons, input switches or a touch screen.

A network interface 416 is also in communication with the controller 410. The network interface 416 may be used to interface with the server side device 116, the network 120, the contact device 104, and/or the other devices 124. The network interface 416 may communicate with a cellular system or with the internet or both.

The controller 410 may also include a language processing module 430, a command generation module 432, and a language processing module 434. Modules 430, 432 and 434 are optional components. That is, command generation and language responsiveness may be performed in remote locations such as external to the mobile device 400.

A recommendation engine 436 may also be included within the controller 410. The recommendation engine 436 may have various data that is stored in a memory 450 of the mobile device 400. For example, selected content, content for which further data was sought, and recorded content may all be stored within the memory 450. The recommendation engine 436 may provide recommendations obtained whose content data or metadata has been obtained from, for example, a head end of media broadcasting system. The recommendations may be tailored to the interests of the user of the mobile device 400. The recommendation engine 436 may communicate the data such as the selected content, the content for which data was sought, the recorded content and the like to the server side device 116.

The controller 410 may also include a gesture identification module 438 that identifies gestures performed on display 440. For example, the gestures may be a move of dragging the user's finger up, down, sideways or holding in a location for a predetermined amount of time. A gesture performed at a certain screen may be translated into a particular command.

A profile manager module 444 may store user profile data within the mobile device. The profile manager module 444 may store user settings, such as favorites and parental controls. The profile manager module 444 may also save relative to the recommendation engine 436 for each individual user of the mobile device. The profile manager module 444 may also receive profile data from the server side device 116.

The profile manager module 444 (and/or memory 450) according to the principles of the present disclosure may also store a collection of identifiers, information about each of the identifiers, information associating each of the identifiers with particular content, information associating each of the identifiers with a number of times the user encountered a contact device related to the identifiers, and/or information associating each of the identifiers with location coordinates of contact devices associated with the content. For example only, the profile manager module 444 may store a lookup table or other database structure that indexes the identifiers with the various types of information described above. In this manner, the profile manager module 444 can update the information about individual identifiers based on actions taken by the user and/or the mobile device 400.

For example, the mobile device 400 may include a GPS or other location module 454. The controller 410 may monitor location coordinates provided by the GPS module 454. If the location coordinates are within a predetermined threshold of the location coordinates stored by the profile manger module 444, the controller 410 selects the corresponding identifiers and generates a notification on the display 440. The controller 410 (e.g., using the profile manager module 444) can then update the information stored in the lookup table for those identifiers to indicate that the user encountered a contact device (and, optionally, the time and day) corresponding to the location coordinates provided by the GPS module 454. The information may also be updated to reflect actions taken by the user (e.g., whether the user simply cleared the notification from the display or set a reminder to access the content in response to the notification). In this manner, further actions performed by the user using the mobile device 400 can be modified using the information stored by the profile manager module 444. Further, the information stored by the profile manager module 444 can also be shared with other devices, such as the server side device 116.

A reminder module 446 may also be included within the controller 410 of the mobile device 400. The reminder module 446 may be associated with a time clock or other device for generating a reminder set by a user. The reminder module 446 may generate a screen display on the display 440 that corresponds to a reminder and provides various choices, such as record or tune, to the user. The reminder module 446 may also set reminders to the user to access content based on the user's actions in response to receiving the notifications as described above.

In an example implementation, the server side device 116 may also include the profile manager module 444 or similar structure. For example, the server side device 116 may independently store and/or update the information in the profile manager module 444 instead of or in addition to the mobile device 400. In this manner, the server side device 116 may be configured to separately monitor information about the identifiers. The information may be provided to advertisers or other entities associated with the content.

Figure 5:
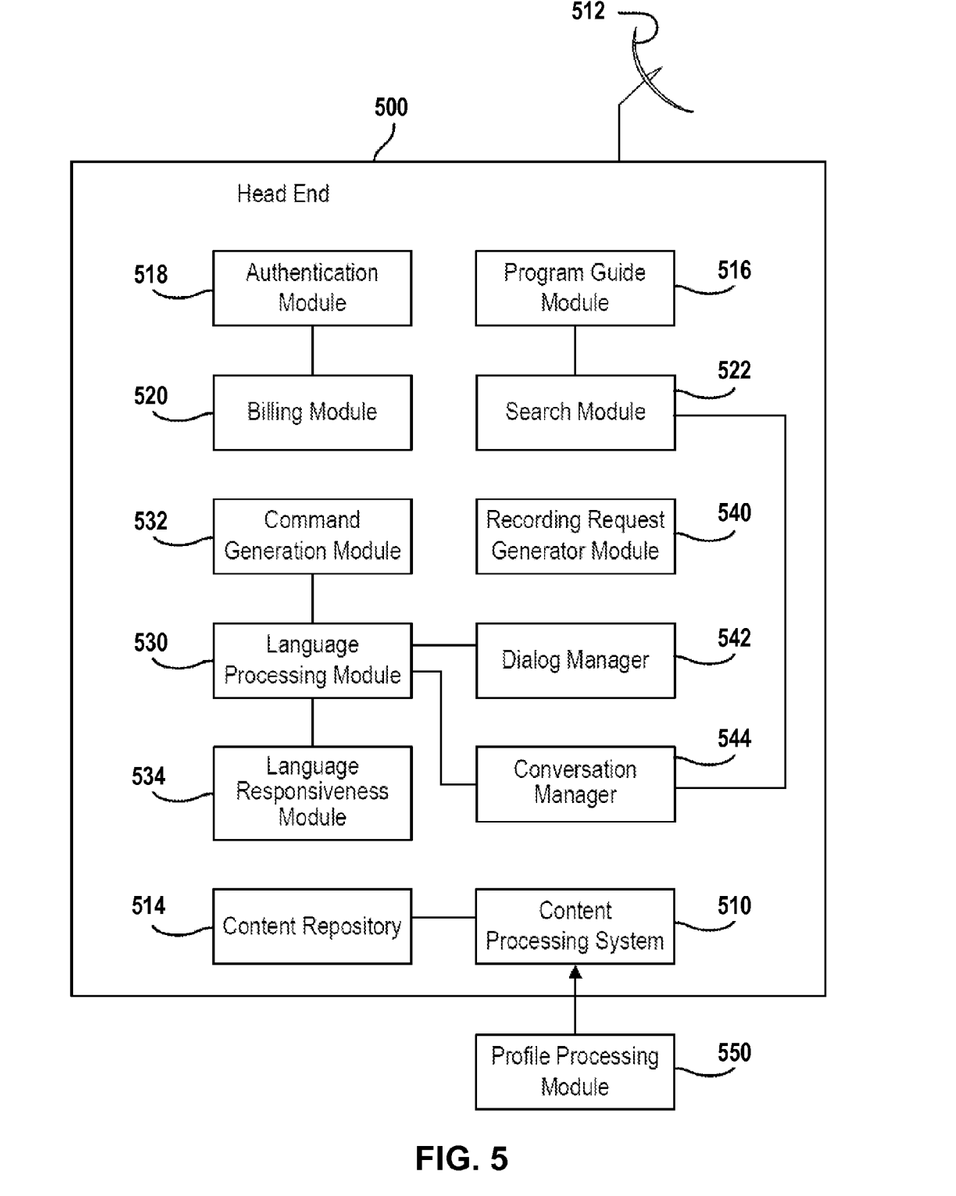
FIG. 5 is a block diagrammatic view of a server side device according to one example of the present disclosure.

For example only, the server side device 116 is described in FIG. 5 as a head end 500 of a media broadcasting system. The head end 500 may include various modules for intercommunicating with the mobile device 400. Only a limited number of interconnections of the modules are illustrated in the head end 500 for drawing simplicity. Other interconnections may, of course, be present in a constructed example. A content processing system 510 processes the content for communication through a satellite or other signal communication device 512. The content processing system 510 may communicate live content as well as recorded content. The content processing system 510 may be coupled to a content repository 514 for storing content therein. The content repository 514 may store and process On-Demand or Pay-Per-View content for distribution at various times. The Pay-Per-View content may be broadcasted in a linear fashion (at a predetermined time according to a predetermined schedule). Linear content is presently broadcasting and may also be scheduled in the future. The content repository 514 may also store On-Demand content therein. On-Demand content is content that is broadcasted at the request of a user receiving device and may occur at any time (not on a predetermined schedule). On-Demand content is referred to as non-linear content.

The head end 500 also includes a program guide module 516. The program guide module 516 communicates program guide data to a user. The program guide module 516 may create various objects that are communicated with various types of data therein. The program guide module 516 may, for example, include schedule data, various types of descriptions for the content and content identifier that uniquely identifies each content item. The program guide module 516, in a typical system, communicates up to two weeks of advanced guide data for linear content to the user receiving devices. The guide data includes tuning data such as time of broadcast, end time, channel, and transponder to name a few. Guide data may also include content available on-demand and pay-per-view content An authentication module 518 may be used to authenticate various user receiving devices, mobile devices and wearable devices that communicate with the head end 500. The authentication module 518 may be in communication with a billing module 520. The billing module 520 may provide data as to subscriptions and various authorizations suitable for the user receiving devices, the mobile devices and wearable devices that interact with the head end 500. The authentication module 518 ultimately permits the user receiving devices and mobile devices to communicate with the head end 500. Authentication may be performed by providing a user identifier, a password, a user device identifier or combinations thereof.

A search module 522 may also be included within the head end 500. The search module 522 may receive a search query comprising one or more search terms from various devices such as a mobile device or user receiving device. The search module 522 may communicate search results to one of the user receiving device or the mobile device. The search module 522 may interface with the program guide module 516 or the content processing system 510 or both to determine search result data. The search results may be personalized according to personal profiles, user data and viewing habits.

The head end 500 may also include a language processing module 530. The language processing module 530 may be used to generate text signals from electrical signals that correspond to audible signals received through the network 120 from the mobile device 400. The language processing module 530 may also be or include a voice converter. The language processing module 530 may communicate the text signals to a command generation module 532. The command generation module 532 generates a user receiving device control command that corresponds to the textual signal generated by the language processing module 530. The command generation module may include various variations that correspond to a particular command. That is, people speak in various ways throughout the country and various regions. Accents and other language anomalies may be taken into consideration within the command generation module 532. Details of this will be described further below.

The head end 500 may also include a language responsiveness module 534 that is used to improve the responsiveness of the language processing module 530 and the command generation module 532. The language responsiveness module 534 is a learning mechanism used to recognize various synonyms for various commands and associate various synonyms with various commands. The details of the language responsiveness module 534 will be described in greater detail below.

The head end 500 may also include a recording request generator module 540. Various signals may be communicated from the mobile device 400 or another networked type computing device. A request to generate a recording may be communicated to the head end 500 and ultimately communicated to the user. The recording request may include a user receiving device identifier and a time to initiate recording. Other data that may be included in the recording request may include a channel, a transponder, a start time, an end time, a content delivery network identifier such as an IP address and various other types of information that allow the user to tune and/or record desired content.

The head end 500 may also include a dialog manager 542. The dialog manager 542 is used to generate a corrected text response such as a sentence in response to a search request. The corrected text response may be a grammatically corrected text response. The grammatically correct text response may be based on a classification that is derived from the received text of the original audible signal. The grammatically correct text response may also be provided in a voice signal that may be played back at the receiving device. An audible signal may be useful in a mobile device where text may not easily be reviewed without being distracted from other tasks. As will be described below, templates may be used in the dialog manager based upon identified data from the original audible request. The output of the dialog manager 542, because of the grammatical correctness, may be easily be read and understood by the user of the device to which the results are returned.

The head end 500 may also include a conversation manager 544. The conversation manager is used to determine whether a second search request is related to a previous first search request. As will be mentioned in detail below, the conversation manager 544 determines whether intents or mentions within the search request are related. The conversation manager starts a new context when the second search is not related to the first search.

The head end 500 may include a profile processing module 550. The profile processing module 550 may receive a user identifier, a device identifier or both to identify a user. The user experience of a wearable device, mobile device, or a set top box may be changed based upon the characteristics of a user. The profile processing module 550 may provide user characteristics to a mobile device, set top box, or other user receiving device through the network. The profile processing module 550 may store various types of data, including a favorite channel list, a playlist and parental settings. The profile processing module 550 may also store information corresponding to content watched so that recommendations may be provided to the user. As content is watched, a content identifier and a user identifier may be communicated to the head end 500 and stored therein. Recommendations may thus be generated for a particular user that corresponds to content of interest to the user. The head end 500 may thus store profile data or user data for all of the system users so that it may be distributed to various devices when necessary.

The profile processing module 550 according to the present disclosure may store information analogous to the information stored by the profile manager module 444 of the mobile device 400. For example, the profile processing module 550 may independently store and/or update the information about the identifiers instead of or in addition to the mobile device 400. In this manner, the head end 500 (or another server side device) may be configured to separately monitor information about the identifiers. The information may be provided to advertisers or other entities associated with the content.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A mobile device, comprising:
 a location module that determines a location of the mobile device; and
 a controller that receives the location of the mobile device as determined by the location module, compares the location of the mobile device to a plurality of stored locations, and provides a notification to a user of the mobile device in response to a determination that the location of the mobile device is within a predetermined range of a first stored location of the plurality of stored locations, wherein the plurality of stored locations correspond to contact devices associated with respective content, wherein the notification includes information about the respective content associated with a first contact device of the contact devices in the first stored location, wherein the controller stores a plurality of identifiers in a memory, each of the identifiers associating one of the plurality of stored locations with the respective content associated with one of the contact devices, wherein the controller receives input from the user accepting or rejecting the notification, and wherein, in response to the user accepting or rejecting the notification, the controller updates a first identifier of the plurality of identifiers corresponding to the first location.

2. The mobile device of claim 1, wherein the location module corresponds to a global positioning system module.

3. The mobile device of claim 1, wherein the predetermined range corresponds to a geo-fence surrounding the first stored location.

4. The mobile device of claim 1, wherein, in response to the user rejecting the notification, the controller clears the notification from a display of the mobile device.

5. The mobile device of claim 1, wherein, in response to the user accepting the notification, the controller provides information associated with the respective content, wherein the information associated with the respective content is accessible to the user at the mobile device.

6. The mobile device of claim 1, wherein the controller performs at least one function of the mobile device based on the first identifier.

7. The mobile device of claim 1 wherein the controller updates data associated with the first identifier in response to the user accepting or rejecting the notification.

8. A method of operating a mobile device, the method comprising:
 determining a location of the mobile device;
 comparing the location of the mobile device to a plurality of stored locations;
 providing a notification to a user of the mobile device in response to a determination that the location of the mobile device is within a predetermined range of a first stored location of the plurality of stored locations, wherein the plurality of stored locations correspond to contact devices associated with respective content, and wherein the notification includes information about the respective content associated with a first contact device of the contact devices in the first stored location;
 storing a plurality of identifiers in a memory, each of the identifiers associating one of the plurality of stored locations with the respective content associated with one of the contact devices;
 receiving input from the user accepting or rejecting the notification; and
 in response to the user accepting or rejecting the notification, updating a first identifier of the plurality of identifiers.

9. The method of claim 8, wherein determining a location of the mobile device includes using a global positioning system.

10. The method of claim 8, wherein the predetermined range corresponds to a geo-fence surrounding the first stored location.

11. The method of claim 8, further comprising, in response to the user rejecting the notification, clearing the notification from a display of the mobile device.

12. The method of claim 8, further comprising, in response to the user accepting the notification, providing information associated with the respective content, wherein the information associated with the respective content is accessible to the user at the mobile device.

13. The method of claim 8, further comprising performing at least one function of the mobile device based on the first identifier.

14. The method of claim 8, further comprising updating data associated with the first identifier in response to the user accepting or rejecting the notification.

* * * * *